US012790175B2

(12) United States Patent
Ito et al.

(10) Patent No.: US 12,790,175 B2
(45) Date of Patent: Nov. 10, 2026

(54) ELEVATOR

(71) Applicant: Hitachi, Ltd., Tokyo (JP)

(72) Inventors: Yasushi Ito, Tokyo (JP); Takashi Abe, Tokyo (JP); Hidetaka Zama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 116 days.

(21) Appl. No.: 18/860,965

(22) PCT Filed: May 17, 2022

(86) PCT No.: PCT/JP2022/020459
§ 371 (c)(1),
(2) Date: Oct. 28, 2024

(87) PCT Pub. No.: WO2023/223404
PCT Pub. Date: Nov. 23, 2023

(65) Prior Publication Data
US 2026/0184538 A1 Jul. 2, 2026

(51) Int. Cl.
*B66B 5/12* (2006.01)
*B66B 5/18* (2006.01)
*B66B 7/02* (2006.01)
*B66B 11/02* (2006.01)

(52) U.S. Cl.
CPC .................. *B66B 5/18* (2013.01); *B66B 7/02* (2013.01); *B66B 11/0206* (2013.01)

(58) Field of Classification Search
CPC .......... B66B 11/0206; B66B 7/02; B66B 5/18
See application file for complete search history.

(56) References Cited

U.S. PATENT DOCUMENTS 1,764,303 A * 6/1930 Higbee ..................... B66B 5/18 187/375
3,768,597 A * 10/1973 Darwent ................... B66B 5/22 187/376

(Continued)

FOREIGN PATENT DOCUMENTS

CN 112714747 A * 4/2021 ......... B66B 11/0206
EP 4328166 A1 * 2/2024 ............... B66B 5/18

(Continued)

OTHER PUBLICATIONS

International Search Report (PCT/ISA/210) issued in PCT Application No. PCT/JP2022/020459 dated Jul. 19, 2022 with English translation (5 pages).

(Continued)

*Primary Examiner* — Michael A Riegelman
(74) *Attorney, Agent, or Firm* — Crowell & Moring LLP

(57) ABSTRACT

An elevator includes: a car having a car room; a guide rail configured to guide a movement of the car; an upper frame provided on an upper portion of the car room; and an emergency stop apparatus configured to stop the movement of the car. The emergency stop apparatus includes a brake mechanism having a braking element configured to clamp the guide rail, a drive mechanism configured to operate the brake mechanism, and an operation mechanism configured to actuate the drive mechanism. The drive mechanism and the operation mechanism are accommodated in the upper frame.

4 Claims, 5 Drawing Sheets

(56) References Cited

U.S. PATENT DOCUMENTS

| | | | | | |
|---|---|---|---|---|---|
| 6,003,636 | A * | 12/1999 | Yumura | B66B 5/044 188/189 |
| 7,849,972 | B2 * | 12/2010 | Higashinaka | B66B 5/18 187/373 |
| 9,120,643 | B2 * | 9/2015 | Meierhans | B66B 5/20 |
| 9,457,989 | B2 * | 10/2016 | Meierhans | B66B 5/20 |
| 9,598,264 | B2 * | 3/2017 | Mizuno | B66B 7/04 |
| 9,637,348 | B2 * | 5/2017 | Okada | B66B 5/18 |
| 10,407,278 | B2 * | 9/2019 | Zhang | B66B 5/22 |
| 11,827,493 | B2 * | 11/2023 | Wang | B66B 5/16 |
| 12,049,384 | B2 * | 7/2024 | Ou | B66B 5/18 |
| 12,122,641 | B2 * | 10/2024 | Kubo | B66B 5/16 |
| 2004/0178023 | A1 * | 9/2004 | Maury | B66B 5/18 187/373 |
| 2007/0170010 | A1 * | 7/2007 | Higashinaka | B66B 5/18 187/374 |
| 2014/0151159 | A1 * | 6/2014 | Mizuno | B66B 5/18 187/359 |
| 2014/0216857 | A1 * | 8/2014 | Mizuno | B66B 5/22 187/359 |
| 2020/0048040 | A1 | 2/2020 | Fauconnet et al. | |
| 2020/0198932 | A1 * | 6/2020 | Hallikainen | B66B 7/044 |
| 2022/0227602 | A1 * | 7/2022 | Kariya | B66B 11/0206 |
| 2022/0380176 | A1 * | 12/2022 | Kubo | B66B 5/06 |
| 2023/0257231 | A1 * | 8/2023 | Kubo | B66B 5/18 187/359 |
| 2025/0353703 | A1 * | 11/2025 | Ito | B66B 5/18 |

FOREIGN PATENT DOCUMENTS

| | | | | | |
|---|---|---|---|---|---|
| JP | 61-157578 | U | | 9/1986 | |
| JP | 2009-46274 | A | | 3/2009 | |
| JP | 2019135183 | A | * | 8/2019 | |
| WO | WO-2005115904 | A1 | * | 12/2005 | B66B 5/18 |
| WO | WO-2021044662 | A1 | * | 3/2021 | B66B 5/22 |
| WO | WO-2022172406 | A1 | * | 8/2022 | B66B 5/04 |

OTHER PUBLICATIONS

Japanese-language Written Opinion (PCT/ISA/237) issued in PCT Application No. PCT/JP2022/020459 dated Jul. 19, 2022 with English translation (7 pages).

* cited by examiner

ELEVATOR

TECHNICAL FIELD

The present invention relates to an elevator including an emergency stop apparatus for stopping a car in an emergency.

BACKGROUND ART

In general, a rope-type elevator includes long objects such as a main rope and a compensation rope that couple a car and a balance weight, and a governor rope used for detecting a speed of the car or the balance weight. Further, it is defined that the elevator is provided with, as a safety apparatus, an emergency stop apparatus that automatically stops an operation of the car when the speed of the car that moves up and down along a guide rail exceeds a defined value.

As this type of emergency stop apparatus in the related art, for example, there is a technique disclosed in PTL 1. PTL 1 discloses the technique in which a brake mechanism that clamps a guide rail and an operation apparatus that operates the brake mechanism of an emergency stop apparatus are accommodated in a vertical frame that constitutes a car.

CITATION LIST

Patent Literature

PTL 1: US2020/0048040

SUMMARY OF INVENTION

Technical Problem

However, in the technique disclosed in PTL 1, since the brake mechanism and the operation apparatus of the emergency stop apparatus are provided in the vertical frame of the car, a size of the vertical frame increases. As a result, the technique disclosed in PTL 1 has a problem that a size of a car room of the car is reduced due to the increase in the size of the vertical frame.

In view of the above problems, an object of the invention is to provide an elevator capable of preventing an increase in a size of a vertical frame.

Solution to Problem

In order to solve the above problems and achieve the objective, an elevator includes: a car having a car room; a guide rail configured to guide a movement of the car; an upper frame provided on an upper portion of the car room; and an emergency stop apparatus configured to stop the movement of the car. The emergency stop apparatus includes a brake mechanism having a braking element configured to clamp the guide rail, a drive mechanism configured to operate the brake mechanism, and an operation mechanism configured to actuate the drive mechanism. The drive mechanism and the operation mechanism are accommodated in the upper frame.

Advantageous Effects of Invention

According to the elevator having the above configuration, it is possible to prevent an increase in a size of a vertical frame.

DESCRIPTION OF EMBODIMENTS

Figure 1:
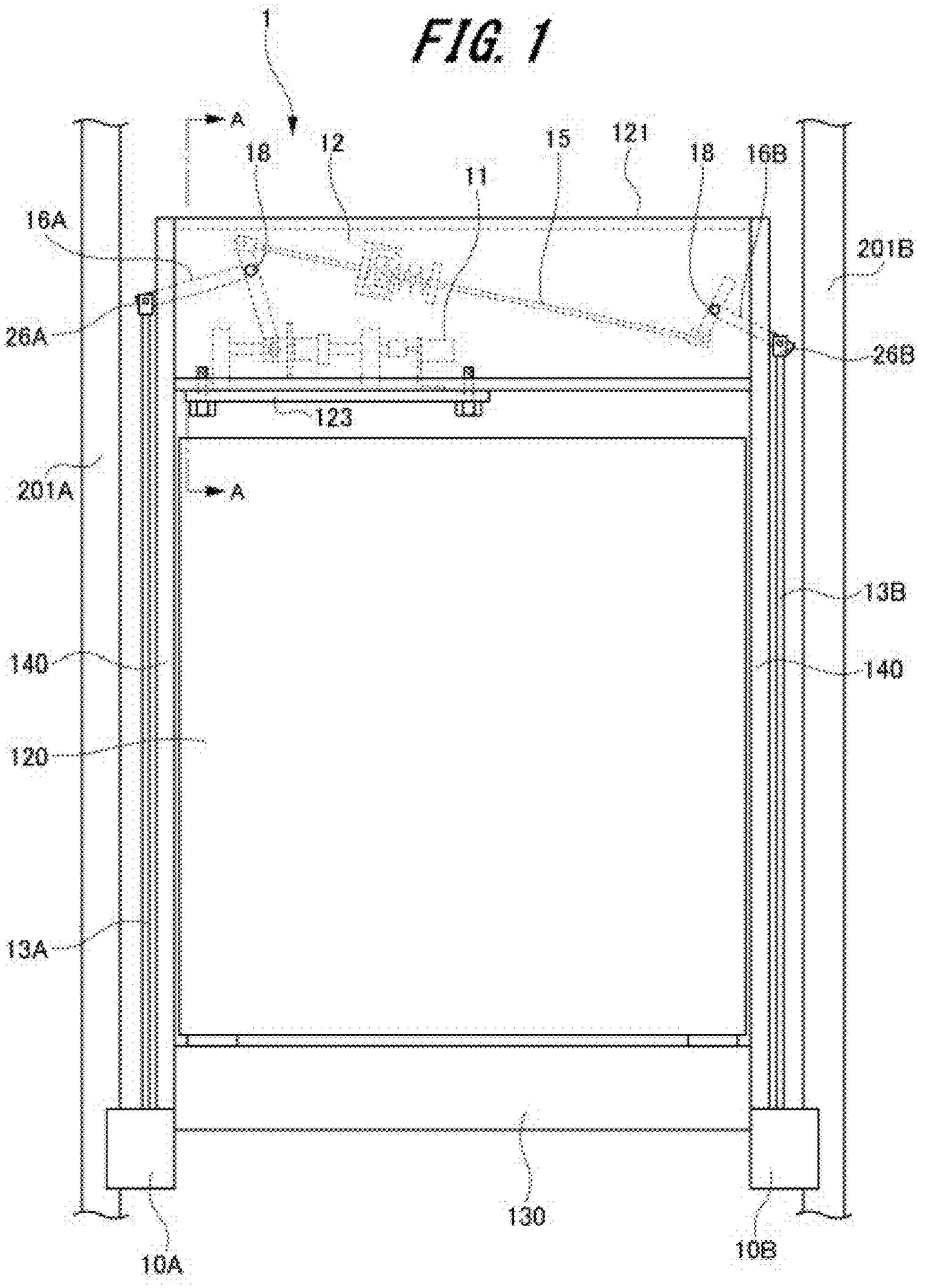
FIG. 1 is a schematic configuration diagram showing a car of an elevator according to a first embodiment.

Hereinafter, an elevator according to embodiments will be described with reference to FIGS. 1 to 6. In the drawings, the same members are denoted by the same reference numerals.

1. First Embodiment

1-1. Configuration Example of Car

First, a configuration of a car of an elevator according to a first embodiment (hereinafter referred to as "present embodiment") will be described with reference to FIGS. 1 and 2.

FIG. 1 is a schematic configuration diagram showing a configuration example of the car according to the present embodiment. FIG. 2 is a cross-sectional view taken along a line A-A shown in FIG. 1.

As shown in FIG. 1, a car 1 of the elevator according to the present embodiment moves up and down in a hoistway formed in a building structure. Further, the car 1 is slidably supported by guide rails 201A and 201B which are provided vertically in the hoistway. The car 1 includes a car room 120 in which a person or a baggage is placed, an upper frame (crosshead) 121, a lower frame 130, vertical frames 140, and an emergency stop apparatus.

The upper frame 121 is provided at an upper portion of the car room 120 in an upper-lower direction, and the lower frame 130 is provided at a lower portion of the car room 120 in the upper-lower direction. The vertical frames 140 couple the upper frame 121 and the lower frame 130, and are provided along the upper-lower direction of the car room 120.

The emergency stop apparatus includes two brake mechanisms 10A and 10B, an operation mechanism 11, a drive mechanism 12, a first lifting member 13A, and a second lifting member 13B. As shown in FIGS. 1 and 2, the operation mechanism 11 and the drive mechanism 12 are provided in the upper frame 121. A detailed configuration of the upper frame 121 and arrangement states of the operation mechanism 11 and the drive mechanism 12 will be described later. The brake mechanisms 10A and 10B are provided at lower end portions of the vertical frames 140 in the upper-lower direction.

The brake mechanisms 10A and 10B include a pair of braking elements (not shown). The pair of braking elements are provided to face each other with the guide rails 201A and 201B interposed therebetween. The pair of braking elements are coupled to the lifting members 13A and 13B. When the pair of braking elements are lifted upward in the upper-lower direction by the lifting members 13A and 13B, the pair of braking elements clamp the guide rails 201A and 201B. Accordingly, an upward and downward movement of the car 1 is braked by the brake mechanisms 10A and 10B.

Next, configurations of the operation mechanism 11 and the drive mechanism 12 will be described with reference to FIGS. 1 and 3.

Figure 3:
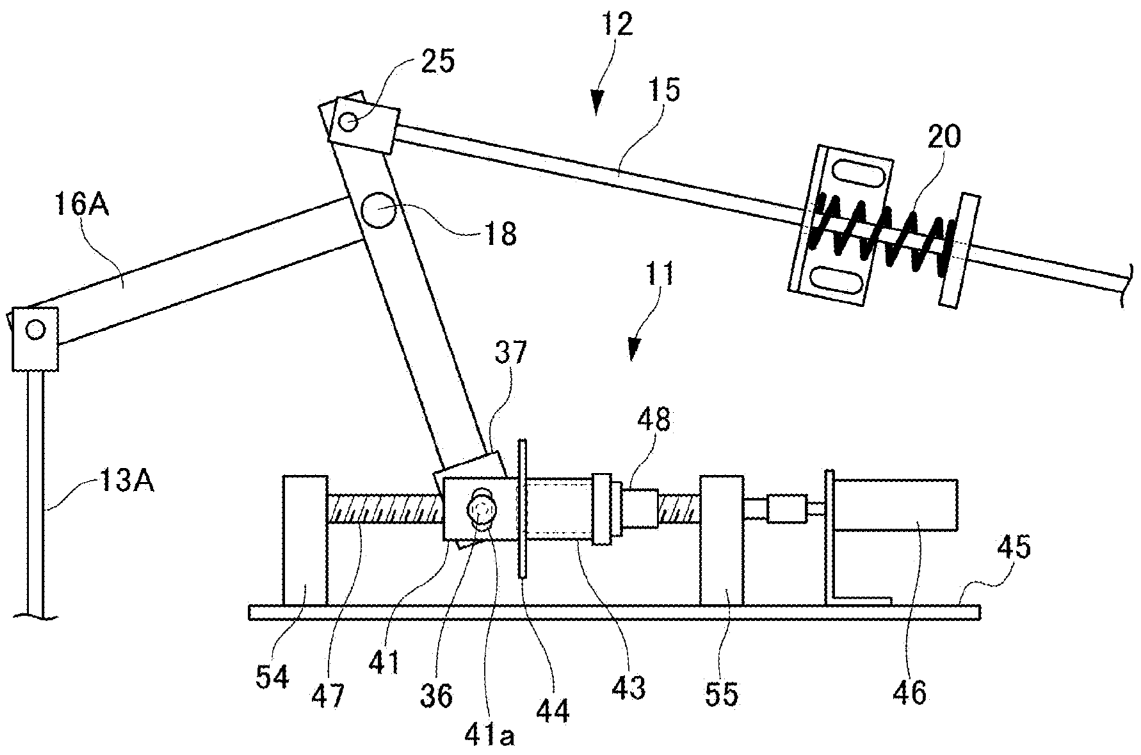
FIG. 3 is a diagram showing an operation mechanism and a drive mechanism of an emergency stop apparatus according to the embodiment.

FIG. 3 is a diagram showing the operation mechanism 11 and the drive mechanism 12.

As shown in FIGS. 1 and 3, the drive mechanism 12 includes a drive shaft 15, a first lifting lever 16A, a second lifting lever 16B, drive shafts 18, 18, and a drive spring 20. The drive shafts 18 are provided at both end portions of the upper frame 121 in a width direction orthogonal to the upper-lower direction. The lifting levers 16A and 16B are rotatably supported by the drive shafts 18.

The first lifting lever 16A and the second lifting lever 16B are formed in substantially T-shapes. The drive shafts 18 are provided at intersections of the T-shapes of the first lifting lever 16A and the second lifting lever 16B.

The first lifting member 13A is connected to the first lifting lever 16A via a connection portion 26A, and the second lifting member 13B is connected to the second lifting lever 16B via a connection portion 26B. As shown in FIG. 3, the first lifting lever 16A is connected to the drive shaft 15 via a coupling portion 25. Similarly, the second lifting lever 16B is connected to the drive shaft 15 via a coupling portion (not shown). Further, an end portion of the first lifting lever 16A on a side opposite from the coupling portion 25 is connected to a connection member 41 of the operation mechanism 11 described later via a lever bracket 37.

The drive shaft 15 is provided in the upper frame 121 along the width direction of the upper frame 121. One end portion of the drive shaft 15 in an axial direction is connected to the first lifting lever 16A, and the other end portion of the drive shaft 15 in the axial direction is connected to the second lifting lever 16B. The drive spring 20 is provided at an intermediate portion of the drive shaft 15 in the axial direction.

The drive spring 20 is implemented by, for example, a compression coil spring. One end portion of the drive spring 20 is fixed to the upper frame 121 via a fixing portion, and the other end portion of the drive spring 20 is fixed to the drive shaft 15 via a pressing member. The drive spring 20 biases the drive shaft 15 toward the other end portion in the axial direction via the pressing member.

When the operation mechanism 11 is actuated, the drive shaft 15 is biased by the drive spring 20 and moves toward the other end portion in the axial direction. Accordingly, the first lifting lever 16A rotates about the drive shaft 18, so that an end portion to which the first lifting member 13A is connected orients upward in the upper-lower direction. In addition, the second lifting lever 16B rotates about the drive shaft 18, so that an end portion to which the second lifting member 13B is connected orients upward in the upper-lower direction. As a result, the first lifting member 13A and the second lifting member 13B are lifted upward in the upper-lower direction in conjunction with each other, so that the brake mechanisms 10A and 10B operate.

As shown in FIG. 3, the operation mechanism 11 includes the connection member 41, an electromagnetic core 43, a movable iron core 44, a base plate 45, a drive motor 46, a feed screw shaft 47, a feed nut 48, and the drive motor. The operation mechanism 11 actuates the drive mechanism 12.

The base plate 45 is formed of a flat plate-shaped member. The base plate 45 is fixed to a placement bracket 123 (see FIGS. 1 and 2) of the upper frame 121 to be described later. A first shaft support portion 54 and a second shaft support portion 55 are fixed to an upper surface portion of the base plate 45 upward in the upper-lower direction.

The first shaft support portion 54 is provided at one end portion of the base plate 45, and the second shaft support portion 55 is provided at the other end portion of the base plate 45. The first shaft support portion 54 and the second shaft support portion 55 are provided to face each other. The feed screw shaft 47 is rotatably supported by the first shaft support portion 54 and the second shaft support portion 55. The drive motor 46 is provided in the second shaft support portion 55. The drive motor 46 may be provided on a first shaft support portion 54 side. A rotary shaft of the drive motor 46 is attached to the feed screw shaft 47 via a coupling.

A trapezoidal thread is formed on an outer peripheral surface of the feed screw shaft 47. The feed nut 48 is screwed to the feed screw shaft 47. The electromagnetic core 43 is fixed to the feed nut 48. The electromagnetic core 43 is provided with a coil. When power is supplied from a power supply (not shown) to the coil and the coil is energized, an electromagnetic stone is formed by the electromagnetic core 43 and the coil. The electromagnetic core 43 faces the movable iron core 44 attached to the connection member 41 to be described later.

When the drive motor rotates, the feed screw shaft rotates. The feed screw shaft 47 rotates, so that a rotational force of the feed screw shaft 47 is converted into a force along an axial direction by a screw portion and a screw hole. The feed nut 48 moves along the axial direction of the feed screw shaft 47. The electromagnetic core 43 to which the feed nut 48 is fixed also moves along the axial direction of the feed screw shaft 47.

When the drive motor rotates forward (regular rotation), the feed nut 48 moves toward the first shaft support portion 54. When the drive motor rotates backward (reverse rotation), the feed nut 48 moves toward the second shaft support portion 55. Here, the second shaft support portion 55 is provided at a standby position for the feed nut 48 and the electromagnetic core 43. When the operation mechanism 11 returns to a standby state and a return state from a braking state, the electromagnetic core 43 abuts on the second shaft support portion 55 via the feed nut 48.

A coupling hole 41*a* is formed in the connection member 41. A connection pin 36 provided on the lever bracket 37 is inserted into the coupling hole 41*a*. Therefore, the connection member 41 is rotatably coupled to the first lifting lever 16A via the lever bracket 37.

The movable iron core 44 is fixed to the connection member 41. The movable iron core 44 is supported by the connection member 41 and faces the electromagnetic core 43 fixed to the feed nut 48. In the standby state shown in FIG. 3, the movable iron core 44 is attracted to the electromagnetic core 43.

The drive motor 46, the feed screw shaft 47, and the feed nut 48 constitute a moving mechanism that moves the electromagnetic core 43 in directions close to and away from the movable iron core 44.

In the standby state, the electromagnetic core 43 is provided on the other end portion side of the feed screw shaft 47 in the axial direction. The coil of the electromagnetic core 43 is energized to excite the electromagnetic core 43. Accordingly, the electromagnetic core 43 and the coil form the electromagnetic stone.

The movable iron core 44 is attracted to the electromagnetic core 43. Therefore, one end portion of the first lifting lever 16A is held via the connection member 41 to which the movable iron core 44 is fixed. As a result, the drive shaft 15 connected to the other end portion of the first lifting lever 16A is biased to one end portion in the axial direction against a biasing force of the drive spring 20.

When a control unit determines that a descending speed of the car 1 exceeds a predetermined speed during a descending movement of the car 1, the control unit outputs an operation command signal to the emergency stop apparatus. Accordingly, the energization of the electromagnetic core 43 is cut off. The cutting off of the energization of the electromagnetic core 43 occurs not only when the descending speed of the car 1 exceeds the predetermined speed, but also when the elevator experiences an electricity outage.

When the energization of the electromagnetic core 43 is cut off, magnetism of the electromagnetic core 43 is eliminated. Accordingly, the drive shaft 15 moves toward the other end portion side in the axial direction by the biasing force of the drive spring 20, and the one end portion of the first lifting lever 16A also moves toward the other end portion in the axial direction together with the drive shaft 15. As a result, the first lifting lever 16A and the second lifting lever 16B rotate about the drive shafts 18. As described above, the drive mechanism 12 is actuated by the operation mechanism 11.

The first lifting lever 16A rotates, so that the movable iron core 44 separates from the electromagnetic core 43. In this manner, by separating the movable iron core 44 from the electromagnetic core 43, the connection member 41 can be moved without being affected by a frictional force and a holding force between the feed screw shaft 47 and the feed nut 48 which form the moving mechanism.

The configurations of the operation mechanism 11 and the drive mechanism 12 are not limited to the above-described examples, and other various configurations can be applied.

1-2. Configuration of Upper Frame and Arrangement State of Operation Mechanism

Next, a configuration of the upper frame 121 and an arrangement state of the operation mechanism 11 will be described with reference to FIGS. 1 and 2.

Figure 2:
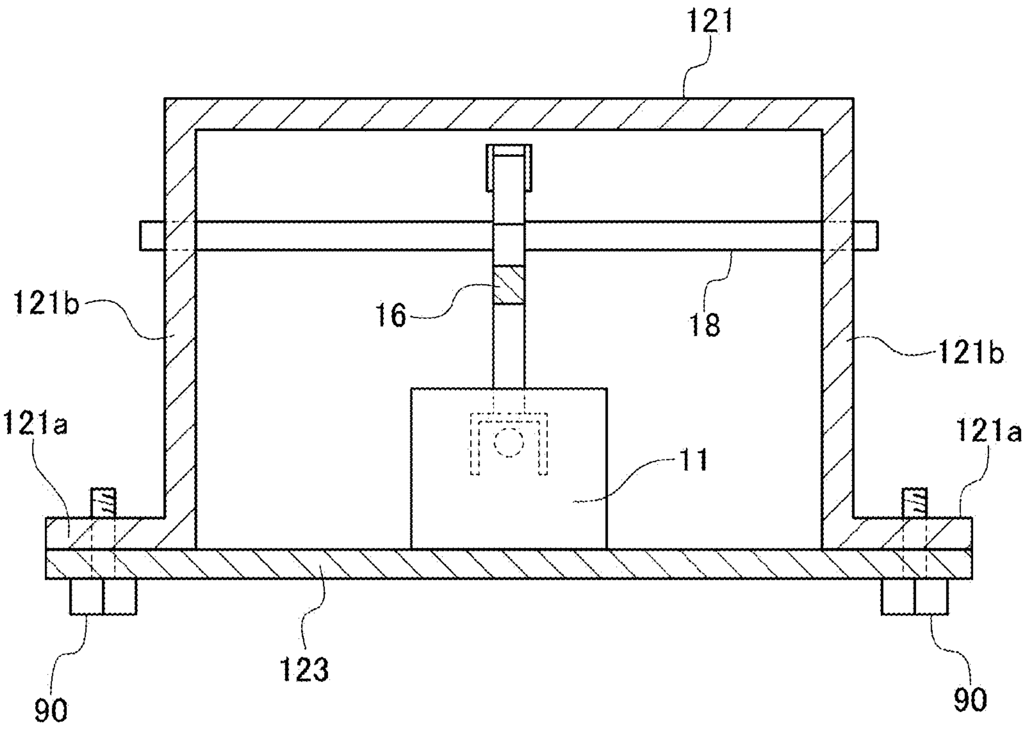
FIG. 2 is a cross-sectional view taken along a line A-A in FIG. 1.

As shown in FIGS. 1 and 2, the upper frame 121 indicating the crosshead is a so-called hat-shaped steel material whose upper end portion in the upper-lower direction is closed and whose lower end portion in the upper-lower direction is open. The upper frame 121 extend along the width direction above the car room 120 of the car 1 in the upper-lower direction. The drive shafts 18 of the drive mechanism 12 are attached to side surface portions 121*b* of the upper frame 121 in a front-rear direction orthogonal to the upper-lower direction and also orthogonal to the width direction.

Flange portions 121*a* are provided at lower end portions of the side surface portions 121*b* of the upper frame 121 in the upper-lower direction. The flange portions 121*a* are bent outward in the front-rear direction from the lower end portions of the side surface portions 121*b*. The placement bracket 123 is fixed to the flange portions 121*a* via fixing bolts 90. The placement bracket 123 closes a part of an opening of the lower end portion of the upper frame 121 in the upper-lower direction. The opening of the lower end portion of the upper frame 121 may be entirely closed by the placement bracket 123.

The above-described operation mechanism 11 is placed on an upper surface portion of the placement bracket 123 in the upper-lower direction. That is, the operation mechanism 11 and the drive mechanism 12 are accommodated in a space of the upper frame 121. Therefore, the upper frame 121 covers the operation mechanism 11 and the drive mechanism 12 from above in the upper-lower direction. Accordingly, dust and rail oil can be prevented from adhering to the operation mechanism 11 and the drive mechanism 12. As a result, it is possible to prevent the operations of the operation mechanism 11 and the drive mechanism 12 from being hindered by the dust and the rail oil, and to improve reliability of the emergency stop apparatus.

In addition, by accommodating the operation mechanism 11 and the drive mechanism 12 of the emergency stop apparatus in the upper frame 121, it is possible to prevent an increase in a size of the vertical frame 140 of the car 1. As a result, it is possible to prevent the increase in the size of the vertical frame 140, and thus it is possible to prevent a horizontal dimension of the car room 120 from being reduced by the vertical frame 140.

2. Second Embodiment

Next, an elevator according to a second embodiment will be described with reference to FIG. 4.

Figure 4:
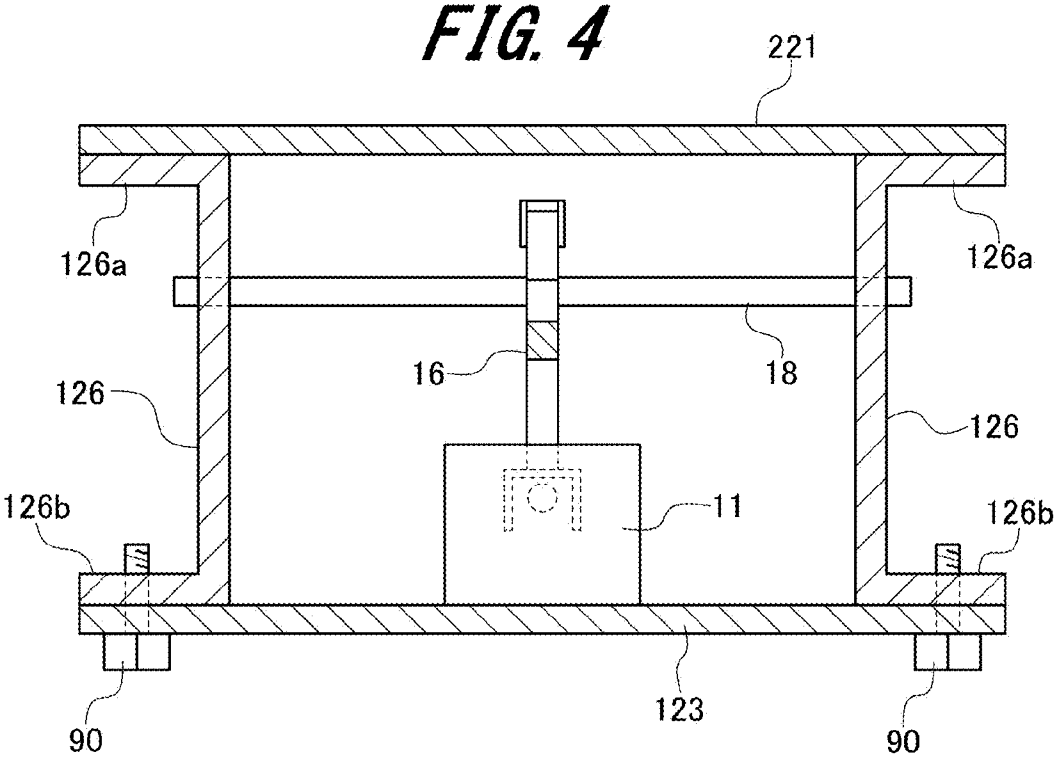
FIG. 4 is a cross-sectional view showing upper frames and an operation mechanism of an elevator according to a second embodiment.

FIG. 4 is a cross-sectional view showing upper frames and an operation mechanism according to the second embodiment.

The elevator according to the second embodiment is different from the elevator according to the first embodiment in the configuration of the upper frame. Therefore, only the upper frame will be described here, and portions common to those of the elevator according to the first embodiment will be denoted by the same reference numerals and duplicated description will be omitted.

As shown in FIG. 4, two upper frames 126, 126 are provided on an upper portion of the car in the upper-lower direction. The upper frame 126 is formed in a substantially U-shape. The two upper frames 126, 126 are provided at an interval in the front-rear direction with side surface portions facing each other. The drive shafts 18 of the t drive mechanism 12 are attached to the side surface portions of the upper frames 126. The drive shafts 18 are provided between the two upper frames 126, 126. Upper flange portions 126*a* are formed at upper end portions of the upper frames 126 on the side surface portions in the upper-lower direction, and lower flange portions 126*b* are formed at lower end portions on the side surface portions in the upper-lower direction.

The placement bracket 123 is fixed to the lower flange portions 126*b* via the fixing bolts 90. The placement bracket 123 is provided to couple the two upper frames 126, 126. The operation mechanism 11 of the emergency stop apparatus is provided on the placement bracket 123. Therefore, the operation mechanism 11 and the drive mechanism 12 are accommodated between the two upper frames 126, 126.

A cover bracket 221 is fixed to the upper flange portion 126*a*. The cover bracket 221 is provided to couple the two upper frames 126, 126, and covers the operation mechanism 11 and the drive mechanism 12 provided between the two upper frames 126, 126 from above in the upper-lower direction. In the second embodiment, the cover bracket 221 and the upper frames 126 constitute the upper frame indicating the crosshead of the car.

Since the other configuration is the same as that of the elevator according to the first embodiment, the description thereof will be omitted, but in the elevator according to the second embodiment including such an upper frame 126, the same action and effect can be obtained as in the elevator according to the first embodiment described above.

3. Third Embodiment

Next, an elevator according to a third embodiment will be described with reference to FIG. 5.

Figure 5:
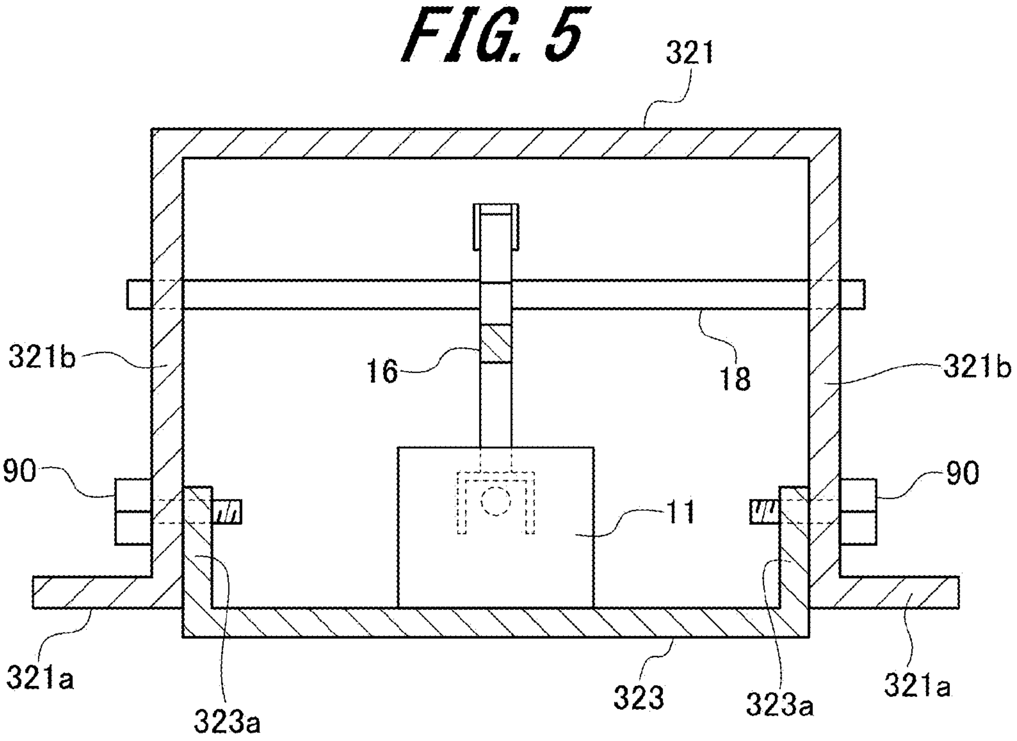
FIG. 5 is a cross-sectional view showing upper frames and an operation mechanism of an elevator according to a third embodiment.

FIG. 5 is a cross-sectional view showing an upper frame and an operation mechanism according to the third embodiment.

The elevator according to the third embodiment is different from the elevator according to the first embodiment in the configurations of the upper frame and the placement bracket. Therefore, the upper frame and the placement bracket will be described here, and portions common to those of the elevator according to the first embodiment will be denoted by the same reference numerals and duplicated description will be omitted.

As shown in FIG. 5, an upper frame 321 is formed in a hat shape similarly to the upper frame 121 according to the first embodiment. Flange portions 321*a* are provided at lower end portions of side surface portions 321*b*. Holes to which the drive shaft 18 is attached in the side surface portions 321*b* are long holes extending in the upper-lower direction.

A placement bracket 323 is fitted between the two side surface portions 321*b*, 321*b* of the upper frame 321 to close a part of the opening at a lower end portion of the upper frame 321 in the upper-lower direction. Fixing pieces 323*a* are provided at both end portions of the placement bracket 323 in the front-rear direction. The fixing pieces 323*a* are bent upward in the upper-lower direction from a placement surface on which the operation mechanism 11 is placed. The fixing pieces 323*a* face the side surface portions 321*b* of the upper frame 321, and are fixed to the side surface portions 321*b* via the fixing bolts 90. A fixing hole through which the fixing bolt 90 is inserted in the fixing piece 323*a* or the side surface portion 321*b* is a long hole extending in the upper-lower direction. That is, the placement bracket 323 is provided to be movable in the upper-lower direction with respect to the upper frame 321.

By using the above-described fixing method for the placement bracket 323, a height of an attachment position of the placement bracket 323 can be adjusted. As a result, it is possible to adjust provision positions of the operation mechanism 11 and the drive shaft 18 of the drive mechanism 12 placed on the placement bracket 323 in the upper-lower direction.

Since the other configuration is the same as that of the elevator according to the first embodiment, the description thereof will be omitted, but in the elevator according to the third embodiment including such a configuration, the same action and effect can be obtained as in the elevator according to the first embodiment described above.

4. Fourth Embodiment

Next, an elevator according to a fourth embodiment will be described with reference to FIG. 6.

Figure 6:
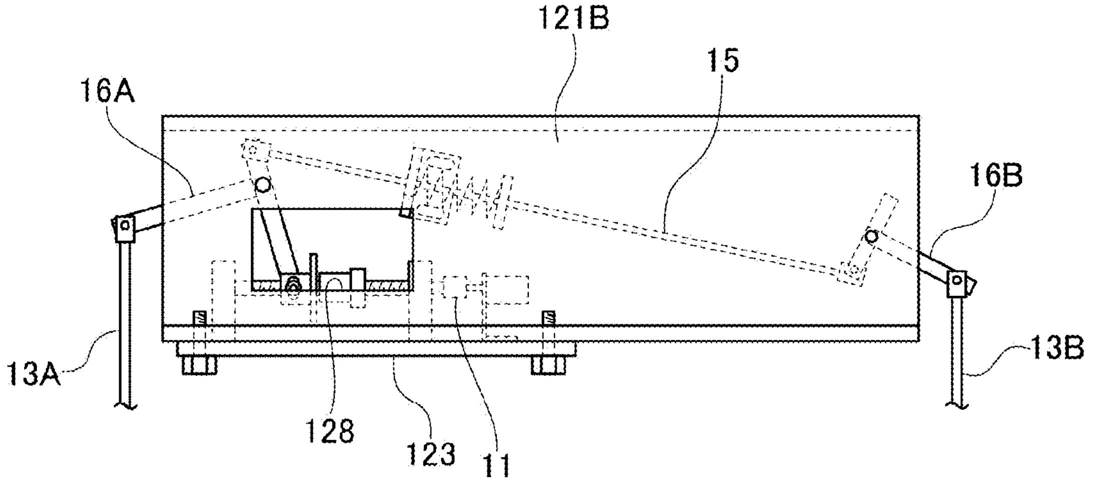
FIG. 6 is a front view showing an upper frame of an elevator according to a fourth embodiment.

FIG. 6 is a front view showing an upper frame according to the fourth embodiment.

The elevator according to the fourth embodiment is different from the elevator according to the first embodiment in the configuration of the upper frame. Therefore, only the upper frame will be described here, and portions common to those of the elevator according to the first embodiment will be denoted by the same reference numerals and duplicated description will be omitted.

As shown in FIG. 6, an opening window 128 is formed in a side surface portion of an upper frame 121B. The opening window 128 is formed at a position facing the operation mechanism 11 accommodated in the upper frame 121B. The opening window 128 is covered by a cover member (not shown) in an openable and closable manner. By providing the opening window 128 in the upper frame 121B, it is possible to check a state of the operation mechanism 11 during assembly, and to easily and visually perform check and inspect work.

Since the other configuration is the same as that of the elevator according to the first embodiment, the description thereof will be omitted, but in the elevator according to the fourth embodiment including such an upper frame 121B, the same action and effect can be obtained as in the elevator according to the first embodiment described above.

The invention is not limited to the embodiments described above and shown in the drawings, and various modifications can be made without departing from the scope of the invention described in the claims.

In the above-described embodiment, both end portions of the upper frame in the width direction are opened, but the invention is not limited thereto, and covers that close both end portions of the upper frame may be provided. Since the dust and the rail oil fall from above in the upper-lower direction, the dust and the rail oil can be prevented from adhering to the operation mechanism 11 and the drive mechanism 12 without providing the covers that close both end portions of the upper frame.

In addition, a housing surrounding the operation mechanism 11 placed on the placement bracket may be provided. Accordingly, it possible to more effectively prevent the dust and the rail oil from adhering to the operation mechanism 11.

Further, the invention can also be applied to a multi-car elevator in which a plurality of cars move up and down in a single hoistway as the elevator.

In the present specification, terms such as “parallel” and “orthogonal” are used, but these terms do not mean only strict “parallel” and “orthogonal”, and may be in a state of “substantially parallel” or “substantially orthogonal” including “parallel” and “orthogonal” and within a range in which functions thereof can be exhibited.

REFERENCE SIGNS LIST

1: car
10A, 10B: brake mechanism
11: operation mechanism
12: drive mechanism
13A, 13B: lifting member
16A, 16B: lifting lever
18: drive shaft
41: connection member
43: electromagnetic core
44: movable iron core
46: drive motor
90: fixing bolt
120: car room
121, 121B, 126, 321: upper frame
121*b*: side surface portion
123, 323: placement bracket
128: opening window
130: lower frame
140: vertical frame
201A, 201B: guide rail
221: cover bracket

The invention claimed is:

1. An elevator comprising:
a car having a car room;
a guide rail configured to guide a movement of the car;
an upper frame provided on an upper portion of the car room; and an emergency stop apparatus configured to stop the movement of the car, wherein the emergency stop apparatus includes a brake mechanism having a braking element configured to clamp the guide rail, a drive mechanism configured to operate the brake mechanism, and an operation mechanism configured to actuate the drive mechanism, and the drive mechanism and the operation mechanism are accommodated in the upper frame, wherein a placement bracket on which the operation mechanism is placed is fixed to the upper frame, and wherein the placement bracket is provided to be movable in an upper-lower direction with respect to the upper frame.

2. The elevator according to claim 1, wherein the upper frame is formed in a hat shape in which an upper portion in an upper-lower direction is closed, and the drive mechanism and the operation mechanism are accommodated in the upper frame.

3. The elevator according to claim 1, wherein two of the upper frames are provided at an interval in a front-rear direction orthogonal to an upper-lower direction and orthogonal to a width direction in which the upper frame extends, the drive mechanism and the operation mechanism are accommodated between the two upper frames, and a cover bracket is fixed to the two upper frames to cover the drive mechanism and the operation mechanism from above in the upper-lower direction.

4. The elevator according to claim 1, wherein an opening window facing the operation mechanism is formed in the upper frame.

* * * * *